United States Patent
Lisak

Patent Number: 6,142,687
Date of Patent: Nov. 7, 2000

[54] ONE HANDED SEQUENTIAL ALPHA NUMERICAL KEYBOARD

[76] Inventor: Stephen J. Lisak, 1550 Waltham Rd., Columbus, Ohio 43221

[21] Appl. No.: 09/270,036

[22] Filed: Mar. 16, 1999

[51] Int. Cl.[7] .................................................. B41J 5/08
[52] U.S. Cl. ............................................ 400/472; 400/489
[58] Field of Search .................................. 400/472, 489, 400/486, 474, 87; 341/22; 235/145 R, 146; 361/679

[56] References Cited

U.S. PATENT DOCUMENTS

| | | | |
|---|---|---|---|
| 3,698,533 | 10/1972 | Illig et al. | 5/10 |
| 4,063,221 | 12/1977 | Watson et al. | 364/900 |
| 4,615,629 | 10/1986 | Power | 400/87 |
| 5,006,001 | 4/1991 | Vulcano | 5/8 |
| 5,059,048 | 10/1991 | Sirkin | 5/10 |
| 5,073,054 | 12/1991 | McDowell | 5/10 |
| 5,124,702 | 6/1992 | Van Ardenne | 341/22 |
| 5,288,158 | 2/1994 | Matias | 5/8 |
| 5,336,002 | 8/1994 | Russo | 5/10 |
| 5,367,298 | 11/1994 | Axthelm | 5/10 |
| 5,481,263 | 1/1996 | Choi | 13/70 |
| 5,487,616 | 1/1996 | Ichbiah | 5/10 |
| 5,497,151 | 3/1996 | Dombroski | 17/94 |
| 5,500,643 | 3/1996 | Grant | 5/10 |
| 5,625,354 | 4/1997 | Lerman | 341/20 |
| 5,682,151 | 10/1997 | Oliveros | 341/23 |
| 5,775,822 | 7/1998 | Cheng | 400/489 |
| 5,887,995 | 3/1999 | Holehan | 400/479 |

*Primary Examiner*—John S. Hilten
*Assistant Examiner*—Darius N. Cone
*Attorney, Agent, or Firm*—Shawnell Williams; Kegler, Brown, Hill & Ritter, L.P.A.

[57] ABSTRACT

A keyboard permitting data entry with only one hand in which the keys are arranged in several clusters or banks, distinctly separated from one another. Each bank contains keys with similar functions (i.e., numerical keys, numerical function keys, alphabetic keys, punctuation keys, program function keys and screen function keys.) The bank of numerical keys are arranged in four (4) rows of keys with three (3) keys in each row. The numerical keys are arranged in numerical sequence from left to right and bottom to top. The bank of alphabet keys are arranged in seven (7) rows of keys with four (4) keys in each row. The alphabet keys are in alphabetical sequence from left to right and bottom to top. Banks of various other keys are also arranged to be easily operated with one hand.

6 Claims, 1 Drawing Sheet

ONE HANDED SEQUENTIAL ALPHA NUMERICAL KEYBOARD

BACKGROUND OF THE INVENTION

The standard typewriter and computer keyboards are based on the QWERTY key arrangement. The QWERTY design is a reference to keyboards that contain the letters Q-W-E-R-T-Y beginning at the upper left end of the second row from the top of the keyboard. The QWERTY keyboard is designed to be used with both hands. However, in certain applications the QWERTY design has been found to be inefficient. Many times the typist needs to use one hand to perform some other task while typing, such as operate a computer mouse, telephone, facsimile machine, or some other peripheral device in conjunction with a keyboard. The inefficiency of the QWERTY keyboard is due to several factors, including the requirement of two hands, slower keying rates, and the difficulty in learning the QWERTY keyboard arrangement.

Although a number of one-handed keyboard designs have been proposed for various applications (i.e., U.S. Pat. Nos. 3,698,533; 4,042,777; 4,615,629; and, 4,849,732), many of these prior art designs require that multiple keys be depressed to generate each letter of the alphabet or the keyboards have the letters spread too far apart to efficiently reach each key with one hand. Furthermore, some one-handed keyboards have the alphabet arranged on the keys in a manner which is difficult to learn and the keyboard is designed for use with one specific hand (i.e. the right-hand only).

Applicant's keyboard allows for efficient data entry or typing with only one hand as a result of the keys being uniquely arranged in several clusters or banks, distinctively separated from one another. Each bank contains keys with similar functions. The bank of numerical keys are arranged in four rows with three keys in each row. The numerical keys are also arranged in numerical sequence from left to right and bottom to top. The bank of alphabetic keys are arranged in seven rows with four keys in each row. The alphabetic keys are in alphabetical order from left to right and bottom to top. Banks of various other keys are also arranged to be easily operated with one hand.

It is an object of the present invention to provide a keyboard which can easily be learned and used by the user.

Another object of this invention is to provide a keyboard which can be operated by the user with only one hand.

A further object of this invention is that the user can operate this keyboard with either the left or right hand in an equally convenient manner.

An additional object of the invention is to provide a keyboard with an efficient arrangement of keys for all the English alphabet characters, numbers, commonly used grammatical symbols, and computer function and screen keys.

BRIEF SUMMARY OF THE INVENTION

In accordance with this invention, there is provided a keyboard for data entry or typing with only one hand in which the keys are organized in an easy to learn and efficient arrangement. The keyboard arrangement includes several clusters or banks of related keys, distinctly separated from one another. Each bank only contain keys with similar functions, (i.e., numerical keys in one bank, numerical function keys in another, alphabet keys in another, punctuation keys in another, program function keys in another, screen function keys in another.)

Although it is important that the banks of keys contain keys with similar functions, it is not critical how the various banks of keys are positioned on the keyboard. Thus, the banks of keys can be arranged in a variety of different ways. However, the arrangement of the individual keys within the numerical and alphabetic banks of keys is important to the present invention.

The bank of numerical keys is arranged in four (4) rows of keys with three (3) keys in each row. They are in numerical sequence from left to right and bottom to top, similar to a standard ten key adding machine in appearance and function. The bank of alphabetic keys is arranged in seven (7) rows of keys with primarily four (4) keys in each row. They are in alphabetical sequence from left to right and bottom to top, with a long space bar at the bottom of the keys. The bank of alphabetic keys also includes a backspace key after the letter "Z." A bank of computer program function keys may be located at the top of the keyboard. These keys are preferably contained in one (1) row consisting of an escape key followed by twelve keys numbered F1 through F12.

The present invention also includes a bank of numerical notation keys located below the bank of program function keys and above the bank of numerical keys. The numerical notation keys consist of three (3) rows having three (3) keys in each row. A bank of punctuation keys is located below the program function bank and to the right of the alphabetic bank of keys. The bank of punctuation keys includes eight (8) rows of keys with three (3) keys in each row. A bank of screen function keys is placed to the right of the bank of program function keys and the bank of punctuation keys. The bank of screen function keys includes four (4) rows of keys with three (3) keys in each row.

The present invention also includes an optional touch pad, mouse pad, track ball or cursor manipulation means that is located below the bank of screen function keys. A bank of four (4) cursor directional keys is preferably situated below the mouse pad (or the empty space.)

This, together with other objects of the invention, will become apparent from the following detailed description of the invention and the accompanying drawing.

BRIEF DESCRIPTION OF THE DRAWINGS

The present invention will be more fully understood by reference to the following detailed description thereof, when read in conjunction with the attached drawing, wherein like reference numerals refer to like elements and wherein.

DETAILED DESCRIPTION OF THE INVENTION

Figure 1:
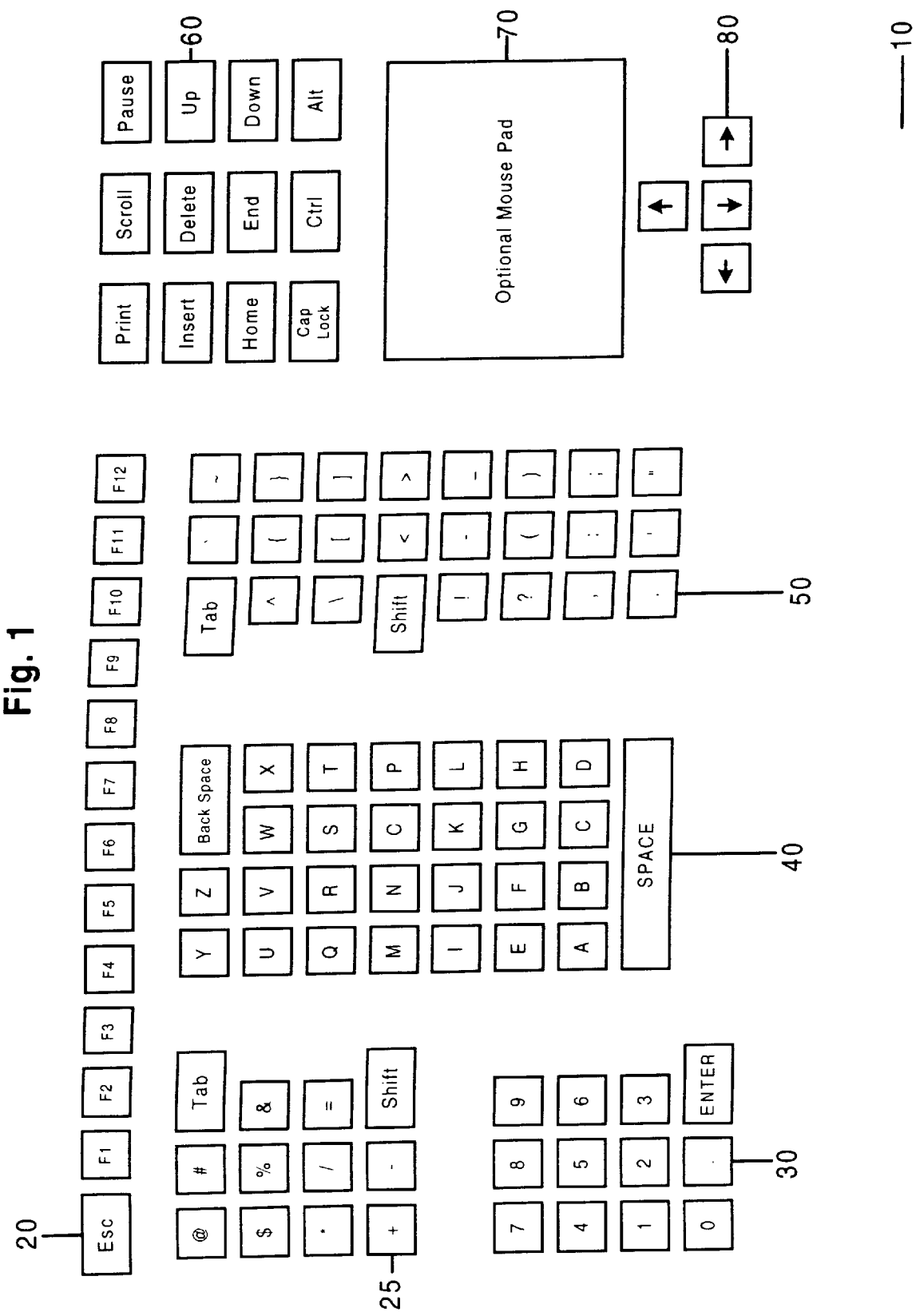
FIG. 1 is a plan view of one embodiment of Applicant's invention.

A preferred embodiment of this invention is illustrated in FIG. 1. This embodiment shows an efficient keyboard 10 for data entry or typing which has alphabetic, numeric, punctuation, screen and function keys that are found on most standard two hand keyboard.

The present invention is designed to be more efficient and easier to use than the standard two hand QWERTY keyboard. Frequently, the typist needs to use one hand to perform some other task while typing. This would include such tasks as operating a computer mouse, telephone, facsimile machine, or some other peripheral device in conjunction with a keyboard. The typist would be more productive if he or she could efficiently continue to type while performing these other activities.

However, using the standard QWERTY keyboard while attempting to conduct two activities at the same time is not practical nor efficient for a couple of reasons. First, the QWERTY keyboard is designed to be used with two hands, not one. Thus, the keys are not easily reachable physically while using only one hand. Second, the arrangement of keys under the QWERTY design presents a mental challenge for the typist when trying to determine the location of keys while using one hand. This mental exercise is counter-intuitive to the training that typists familiar with the QWERTY design have received. This mental process of determining the best way to press a key with the right hand when the typist is supposed to press that particular key with the left hand under the QWERTY design, reduces typing efficiency and increases mental frustration. These problems are eliminated with Applicant's invention.

Applicant's keyboard 10 is specifically designed for data entry and typing with one hand. The typist is free to use the other hand for operating a computer mouse, telephone, etc. Thus, the typist can be more efficient by performing other activities with this "free" hand. Furthermore, the keys on Applicant's keyboard are organized into an easy-to-learn arrangement. The keyboard arrangement includes several clusters or banks of keys. Each of these banks only contain keys with related functions. Thus, there is preferably a bank for numerical keys 30, numerical function keys 25, alphabetic keys 40, punctuation keys 50, program function keys 20, screen function keys 60, mouse pad 70, and directional cursor (arrow) keys 80.

The bank of program function keys 20, screen function keys 60, mouse pad 70 and directional cursor keys 80 are optional for computer users. The bank of program function keys 20 consists of one (1) row of keys proceeding from left to right, with an escape key followed by twelve keys numbered F1 through F12. The bank of numerical notation keys 25 consists of the plus sign (+), the minus sign (−), shift, asterisk (*), backslash (\), the equal sign (=), the dollar sign ($), the percent sign (%), an ampersand key, the "at" sign (@), the pound sign (#), and a tab key, but not necessarily in that order. The bank of numerical notation keys 25 contains four (4) rows of keys with three (3) keys in each row.

The bank of numerical keys 30 also contains four (4) rows of keys with three (3) keys in each row, which is similar to the arrangements of the keys on a ten key adding machine. These keys are in numerical sequence from left to right and bottom to top. The first row at the bottom of the bank of numerical keys 30 consists of the zero (0), decimal point (.) and enter keys. The second row contains keys for the numbers 1, 2 and 3. The third row includes keys for the numbers 4, 5 and 6. The fourth row has keys for the numbers 7, 8 and 9.

A bank of alphabet keys 40 is also included in Applicant's invention. At the bottom of the bank of alphabetic keys 40, is a long space bar and above it are seven (7) rows of keys with four (4) keys in each row. These keys are in alphabetical sequence from left to right and bottom to top. The first row consists of keys for the letters A, B, C and D. The second row contains keys for of the letters E, F, G and H. The third row includes keys for the letters I, J, K and L. The fourth row consists of keys for the letters M, N, 0 and P. The fifth row has keys for the letters Q, R, S and T. The sixth row contains keys for the letters U, V, W and X. The seventh row includes keys for the letters Y, Z and a backspace key.

In addition, Applicant's keyboard 10 also includes a bank of punctuation keys 50. The bank of punctuation keys 50 consists of eight (8) rows of keys with three (3) keys in each row. The first row at the bottom of the bank of punctuation keys 50 contains keys for the period (.), apostrophe ('), and the quotation mark ("). The second row includes the keys for the comma (,), colon (:), and a semi-colon (;). The third row consists of keys for the question mark (?), left parentheses (() and the right parentheses ()). The fourth row contains keys for the exclamation mark (!), dash (—) and the underscore symbol (_). The fifth row consists of the shift key followed by the less than (<) and the greater than (>)keys. The sixth row includes keys for the backslash (\), left bracket ([) and the right bracket (]). The seventh row consists of keys for the caret symbol (^), left curly brace ({) and the right curly brace (}). The eighth row includes a tab key followed by the character accent () and the tilde symbol (~).

The present invention also includes a bank of screen function keys 60. The bank of screen function keys 60 contains four (4) rows of keys with three (3) keys in each row. The first row consists of the cap lock, ctrl and alt keys. The second row contains the home, end and down keys. The third row includes the insert, delete and up keys. The fourth row includes the print, scroll and pause keys.

The Applicant's keyboard 10 could also include the optional mouse pad 70. A bank of four (4) directional cursor (arrow) keys 80 would be located below the mouse pad 70 (or the empty space.) The bank of four (4) directional cursor keys 80 includes two (2) rows consisting of three (3) keys in the first row and one (1) key in the second row. The first row starting from the bottom of the four directional cursor bank 80 consists of three keys which include the left arrow (←), down arrow (↓) and the right arrow (→). The second row includes only the up arrow (↑) key in the second column.

The present invention allows the typist to use one hand to quickly and efficiently type any combination of characters contained in the various banks of keys. The keys of this keyboard 10 are uniquely arranged to allow the typist to use the data entry techniques used to enter data with ten key adding machines. This is quick and efficient one hand typing. However, the typist using Applicant's invention has the added benefit of being able to use this same technique for typing alphabetical data.

Although this keyboard description is only one embodiment of Applicant's invention, this invention could be used with a wide variety of other keyboards including membrane keyboards, touch screen, etc. Thus, Applicant's invention could be used with numerous data entry or typing devices.

While this invention has been shown and described with respect to a detailed embodiment thereof, it will be understood by those skilled in the art that various changes in form and detail thereof may be made without departing from the scope of the claims of the invention.

What is claimed is:

1. A keyboard arrangement for use by one hand of an operator, allowing for efficient data entry, comprising:

at least three banks of related keys distinctively separated wherein:

a first bank of alphabet keys arranged in seven rows with four columns in alphabetical sequence from left to right and bottom to top, including a space bar key and a backspace key;

a second bank of numerical keys arranged in four rows with three columns in ascending order from left to right and bottom to top, including a decimal point key and an enter key; and a third bank of numerical notation keys arranged in four rows with three columns, including a shift key and a tab key.

2. The keyboard as recited in claim 1, wherein said keyboard further comprises a bank of punctuation keys arranged in eight rows with three columns.

3. The keyboard as recited in claim 1, wherein said keyboard further comprises a bank of program function keys arranged in one row with thirteen keys, including an escape key.

4. The keyboard as recited in claim 3, wherein said keyboard further comprises a bank of screen function keys arranged in four rows with three columns.

5. The keyboard as recited in claim 3, wherein said keyboard further comprises a computer mouse pad.

6. The keyboard as recited in claim 3, wherein said keyboard further comprises a bank of four directional cursor keys.

* * * * *